United States Patent [19]

Chevrette et al.

[11] Patent Number: 5,774,179
[45] Date of Patent: Jun. 30, 1998

[54] METHOD AND SYSTEM FOR FAST MICROSCANNING

[75] Inventors: Paul Chevrette, Quebec; Jean Fortin, Ste-Foy, both of Canada

[73] Assignee: Minister of National Defence, Ottawa, Canada

[21] Appl. No.: 565,347

[22] Filed: Nov. 30, 1995

[30] Foreign Application Priority Data

Dec. 28, 1994 [CA] Canada ................................. 2139182

[51] Int. Cl.⁶ ............................................. H04N 5/225
[52] U.S. Cl. ........................ 348/218; 348/335; 348/340
[58] Field of Search ............................... 346/218, 219, 346/335, 340, 208; 359/813, 814

[56] References Cited

U.S. PATENT DOCUMENTS

| | | |
|---|---|---|
| 4,633,317 | 12/1986 | Uwira . |
| 4,780,739 | 10/1988 | Kawakami et al. ............... 348/208 |
| 5,189,294 | 2/1993 | Jackson et al. . |
| 5,291,327 | 3/1994 | McEwan . |
| 5,301,042 | 4/1994 | Blanding . |
| 5,335,032 | 8/1994 | Onuuki et al. ..................... 348/208 |
| 5,335,091 | 8/1994 | Palum . |
| 5,526,125 | 6/1996 | Imura et al. ....................... 359/813 |
| 5,557,327 | 9/1996 | Haswgawa et al. ............... 348/219 |
| 5,581,404 | 12/1996 | Misaka et al. ..................... 358/813 |
| 5,615,397 | 3/1997 | Shiomi et al. ..................... 348/208 |

*Primary Examiner*—Wendy Garber
*Attorney, Agent, or Firm*—Neil Teitelbaum & Associates

[57] ABSTRACT

An imaging system for implementation of a microscan includes an array of sensing elements that define an image plane. A movable lensing system is adapted to focus an image on the image plane. Piezoelectric positioners are provided to move the lensing system a predetermined amount and on a predetermined plane parallel to the image plane so that the image focused by the lensing system on the array of sensing elements is displaced on the image plane by the movement of the lensing system. As the lens is moved by the positioners and thus the optical axis of the lens, the image passing through the lens is also moved on the image plane. Moving the lens back and forth or in a predetermined pattern provides dithering of the image so that microscanning can be employed.

21 Claims, 10 Drawing Sheets

METHOD AND SYSTEM FOR FAST MICROSCANNING

FIELD OF THE INVENTION

This invention relates to an imaging system using focal plane arrays (FPAs), and in particular but not exclusively to such imagers, imaging in the Infra Red (IR) wavebands.

BACKGROUND OF THE INVENTION

IR imaging systems are becoming more important in many fields, particularly in military, security and search and rescue applications. Early IR imagers employed a small number of detector elements, across which was scanned an IR image of the scene via a system of mirrors. More recent developments include imagers based on 2 dimensional arrays of detector elements, so called staring arrays, which require no scanning to produce a useful image of the scene. The dwell time available for each detector element in such systems is increased considerably over earlier scanner systems resulting in significantly improved system performance being achievable from comparable detector materials. An IR system designer can choose whether to exploit this increase in performance or use a lower performance detector material to achieve a similar sensitivity as in the earlier scanner systems. High system performance is typified by imagers based on arrays of Cadmium Mercury Telluride cooled to liquid nitrogen temperatures, whilst conventional levels of performance are achieved by imagers based on Schottky barrier arrays and pyroelectric ceramics. These latter systems offer significant advantages in terms of cost and or logistical support requirements (such as coolant supplies) over the high performance systems.

Unfortunately, several disadvantages of FPA imagers must be overcome to provide performance comparable with conventionally scanned imagers. Current FPAs are only available in limited pixel counts, typically 128×128, 256×256 or 512×512 elements, which is insufficient to match the spatial resolution of the best scanned imager systems. Eventually, the development of suitable fabrication technologies will overcome this problem, resulting in large pixel densities.

Electronic imaging systems employing solid state image sensors or charge coupled device (CCD) arrays are used to produce standard video resolution (512×512 pixel) as well as higher resolution images. Image sensors are utilized in television cameras and other electro-optic systems to convert a visual presentation on the sensor's surface into a serial pulse train of electrical signals. The pulse train is then processed and conditioned for whatever purpose is to be made of information contained therein. When the CCD is used for image reproduction as part of an electro-optical depiction system it is placed in the focal plane of an optic system comprised of lenses, collimators, etc. Multiplexors associated with the component CCDs convert the image sensed in a focal plane to a train of pulses, the amplitude of which is directly proportional to the intensity of illumination occurring at each photo site or pixel of the sensors.

Silver halide photographic images can be captured with an acceptable loss in resolution if an array with at least 2000×3000 pixels is used. A 4000×6000 pixel array is probably closer to optimum. At present, the largest arrays contain about four million pixels in a 2000×2000 array. At this density the arrays are very expensive and still do not produce images with silver halide photographic resolution. If the number of pixels is simply increased in a CCD to satisfy the need for high integration, the chip size will be increased. If the number of pixels is increased and their size decreased in order to increase the number of pixels without changing the chip size, the integration of pixels must be greatly enhanced. In this case it is technically difficult to prepare the high density CCD and even if fabrication techniques allow the manufacture of such a CCD, the circuit configuration becomes complicated and the power consumption becomes high, giving rise to new problems.

Figure 1A:
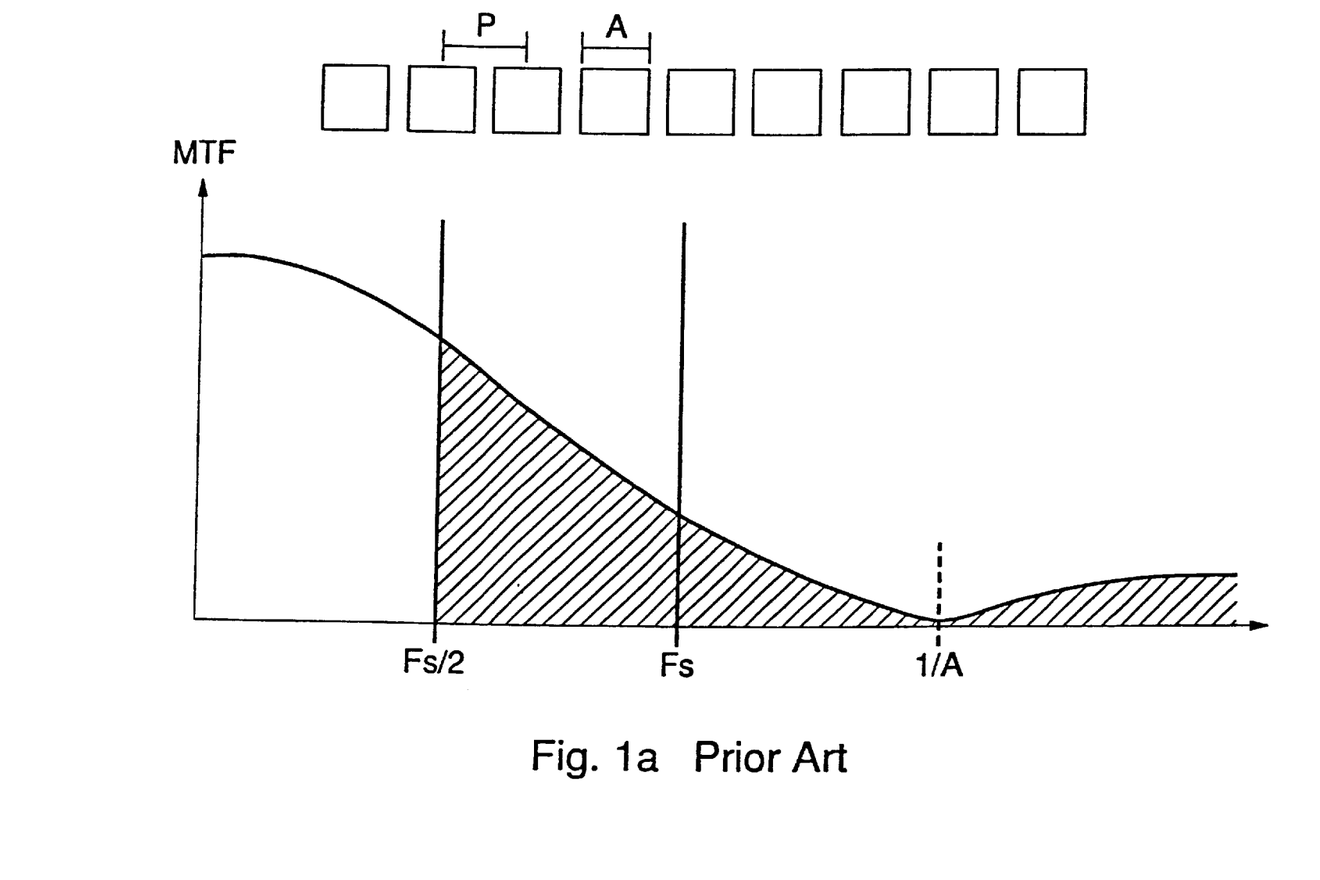
FIG. 1a is a graph depicting modular transfer frequency (MTF) versus spatial frequency ($F_s$)

A fundamental problem, however, concerns the basic physics of imaging via a focal plane array. This is shown schematically in FIG. 1a, where a single row of elements from the detector array is considered. For simplicity the elements are considered square in shape, of length given by A, and are fabricated with a pitch P. The modulation transfer function (MTF) of a single element in the array is given by the modulus of the sinc function, as shown in the figure, with the first zero occurring at a spatial frequency of 1/A. Since an array of such elements is used, this MTF as shown in FIG. 1a is convolved with a series of delta-functions separated by spatial frequencies of Fs(=1/P), the sampling frequency. As shown in the figure, this results in a folding of the MTF curve into the area between 0 and Fs/2. Spatial frequencies higher than Fs/2 which are present in the image are reproduced by the array as lower, alias frequencies in the range 0 to Fs/2. For 2 dimensional arrays the effect is much worse than FIG. 1a shows, since aliasing occurs in both axes simultaneously. The effect is similar to conventional data sampling limitations, governed by Nyquist's Theorem, except that it occurs in the spatial domain rather than in the post detection electronics.

Figure 1B:
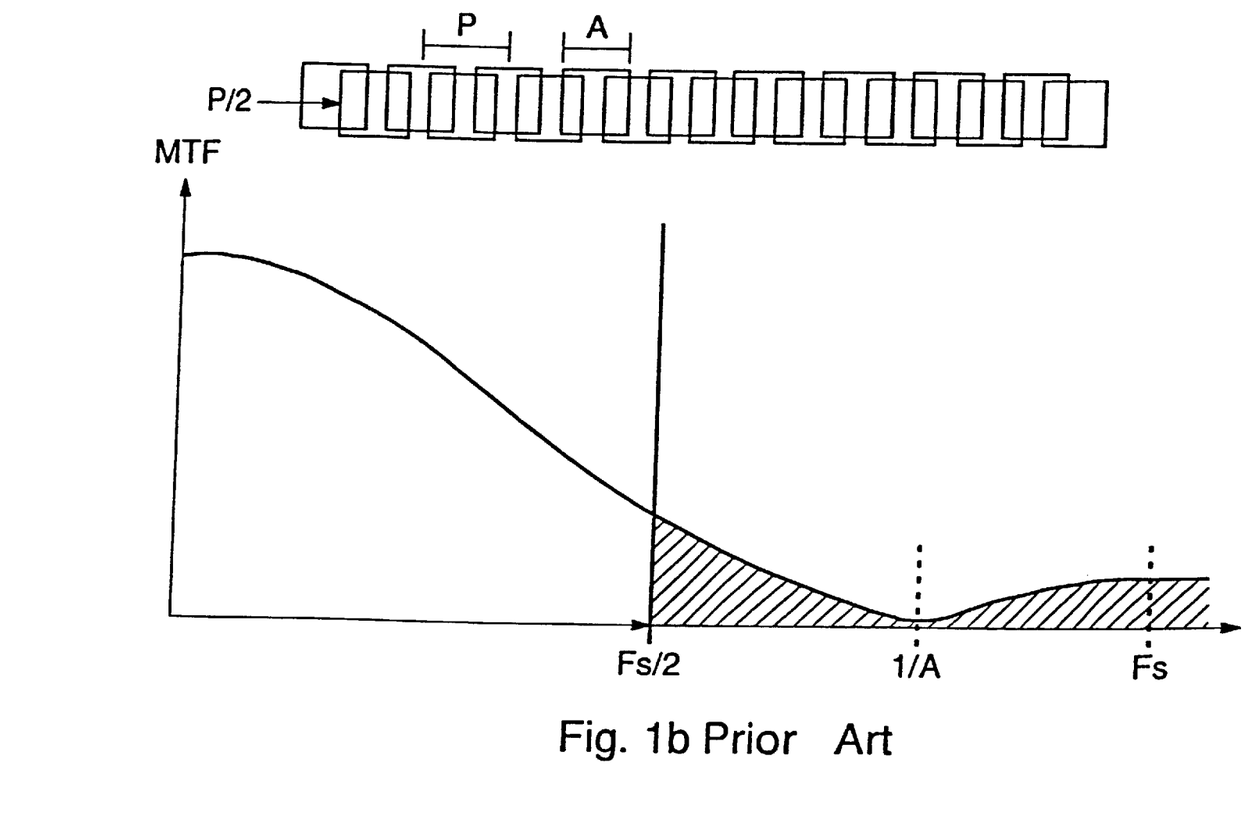
FIG. 1b is a graph similar to FIG. 1a in which the image is moved by ½P.

For staring systems, therefore, the MTF is limited by the inverse of twice the detector pitch, and the full MTF available from the detector geometry cannot be exploited as it would in a scanning system. One technique which has been widely used to overcome this limitation is termed dithering, or microscan, or mechanical interlace. In this technique, the image of the scene is moved across the detector array, when the device is not imaging, by a fraction of the inter element pitch, such that an integral number of steps fit into the pitch. The display of the subsequent field of data is shifted by a corresponding amount to ensure the fidelity of the reconstructed image. The effect of microscanning is shown in FIG. 1b, which considers a first order microscan, in which the image is moved by ½P. The MTF of the individual elements remain unchanged, however the sampling frequency is multiplied by the microscan factor, in this case is 2. As a result a much larger portion of the MTF can be utilized before aliasing is encountered.

Microscanning therefore permits the MTF of scanning systems to be achieved in staring systems. Different orders of microscan are frequently adopted, such as 2×2 or 3×3, the numbers representing the number of steps in each axis per pixel pitch. The optimum choice of microscan order depends on the relative size of the element and sampling pitch and the effect of other factors such as the optical MTF.

Microscanning, or dithering has been achieved by a variety of mechanical/optical dithering devices; for example, U.S. Pat. No. 4,517,603 (Epsztein and Guyot) discloses a device for producing televised pictures with a high degree of resolution. The device comprises a photosensitive matrix which receives an optical image and an electromechanical apparatus for displacing the matrix with respect to the image. The displacement is equal to half the size of the pixel. In the construction of the device, the photosensitive matrix is surrounded by a mechanical support guided by members which also act as end of travel stops for limiting the total displacement of the matrix to a half line.

The support is subject to a restoring force supplied by springs whose rigidity must be such that the matrix displacement takes place in less than about 2 microseconds. The support is subject to an exciting force supplied by a moving coil immersed in a radial magnetic field and controlled by a square signal generator.

U.S. Pat. No. 4,554,586 (Tanuma et al.) discloses a solid state image sensing device which includes a base board fitted with a CCD serving as an area sensor and a pair of bimorph piezoelectric vibrating elements which jointly vibrate the CCD relative to an incoming image in a plane substantially parallel with the surface of the base board. The piezoelectric vibrating elements are elastically held above the base board by supporting plates having a spring action.

U.S. Pat. No. 4,581,649 (Morokawa) discloses a pickup system which has an image sensor including a plurality of photodetectors arranged in two dimensions and an optical system having a lens for forming an image on the image sensor. A vibrator is provided for vibrating the image on the image sensor so as to oscillate the picture data and a scanner is provided to be operative in synchrony with the vibration of the image to change the oscillated picture data to data for a fixed image. The vibrator comprises a pair of piezoelectric vibrator elements disposed on both sides of the support plate which is supported on a support. A counterbalance is secured to an electrode of the vibrator element so that when both vibrator elements are driven by a signal from a driving signal source, the image sensor and balance are reciprocated and the vibration of the system is canceled.

U.S. Pat. No. 4,607,287 (Endo et al.) discloses a solid-state image sensing device in which a CCD is coupled to fixed bimorph piezoelectric vibrators by which it is given a wobbling-swing drive during image pickup. This wobbling-swing drive is controlled by a controller which provides two vibrations: a swing vibration and a wobble vibration superimposed on the swing vibration so that the pickup operation is performed at each sampling position while wobbling when each pixel is positioned in each field.

U.S. Pat. No. 4,633,317 (Uwira et al.) discloses a high resolution electro-optical detector system incorporating a mosaic CCD. The image of the field is periodically displaced along a closed trajectory to cover the interstices between the detector elements of the mosaic detector. The image is moved relative to a stationary mosaic detector. Each image element performs a movement clockwise along a closed circular trajectory. The image is rotated by means of a plane mirror which is supported on three piezo elements. The mirror carries out a uniform rotating motion when three alternating voltages mutually displaced in phase by 120 degrees are supplied to the three piezo elements which are angularly spaced by 120 degrees. Uwira et al also disclose the use of a wedge shaped optical element arranged to rotate in the path of the system effecting a gyrating image offset. Unfortunately this system has been known to have serious drawbacks. Uwrira's wedge is in effect a prism and suffers from chromatic aberration, wherein the wavelengths light passing through the wedge are separated into their respective colours.

U.S. Pat. No. 4,652,928 (Endo et al.) discloses a solid state image sensing system which includes a CCD and a vibration table. The vibration table moves the CCD in such a manner that it is vibrated in a horizontal direction in one vibration cycle consisting of two succeeding frame periods each having two fields. The CCD is fixed to the rear side of a vibration table opposite its image pickup side which faces a lens. The table comprises a bimorph piezoelectric element and vibrates in a cycle of two frame periods under a predetermined complicated vibration mode in response to a swing drive signal.

U.S. Pat. No. 4,755,876 (Dangler) discloses an image scanner which utilizes a dither plate to steer an image onto a sparsely-populated image sensor. A DC motor, which is responsive to a servo control is used to position the dither plate relative to the sensor. The position of the dither plate is sensed by a linear proximity sensor which is part of a closed-loop servo control for the motor.

U.S. Pat. No. 4,947,239 (Kondou and Ono) discloses a swing-driven solid state imaging device which has a CCD image sensor, a stacking piezoelectric element and a package structure. The piezoelectric element serves as an actuator for vibrating the image sensor in a plane substantially perpendicular to the image.

In many of these prior art devices the image sensor is physically moved from one position to another, this is often not desirable as the sensor is usually enclosed in a heavier piece of the imaging system. Magnetic displacement of the CCD platform (Epsztein) using a platform with a small spring constant leads to overshoot and oscillation after displacement. A wedged rotating plate with servo motor control (Dangler) has also been used but this technique is expensive to implement.

Figure 1C:
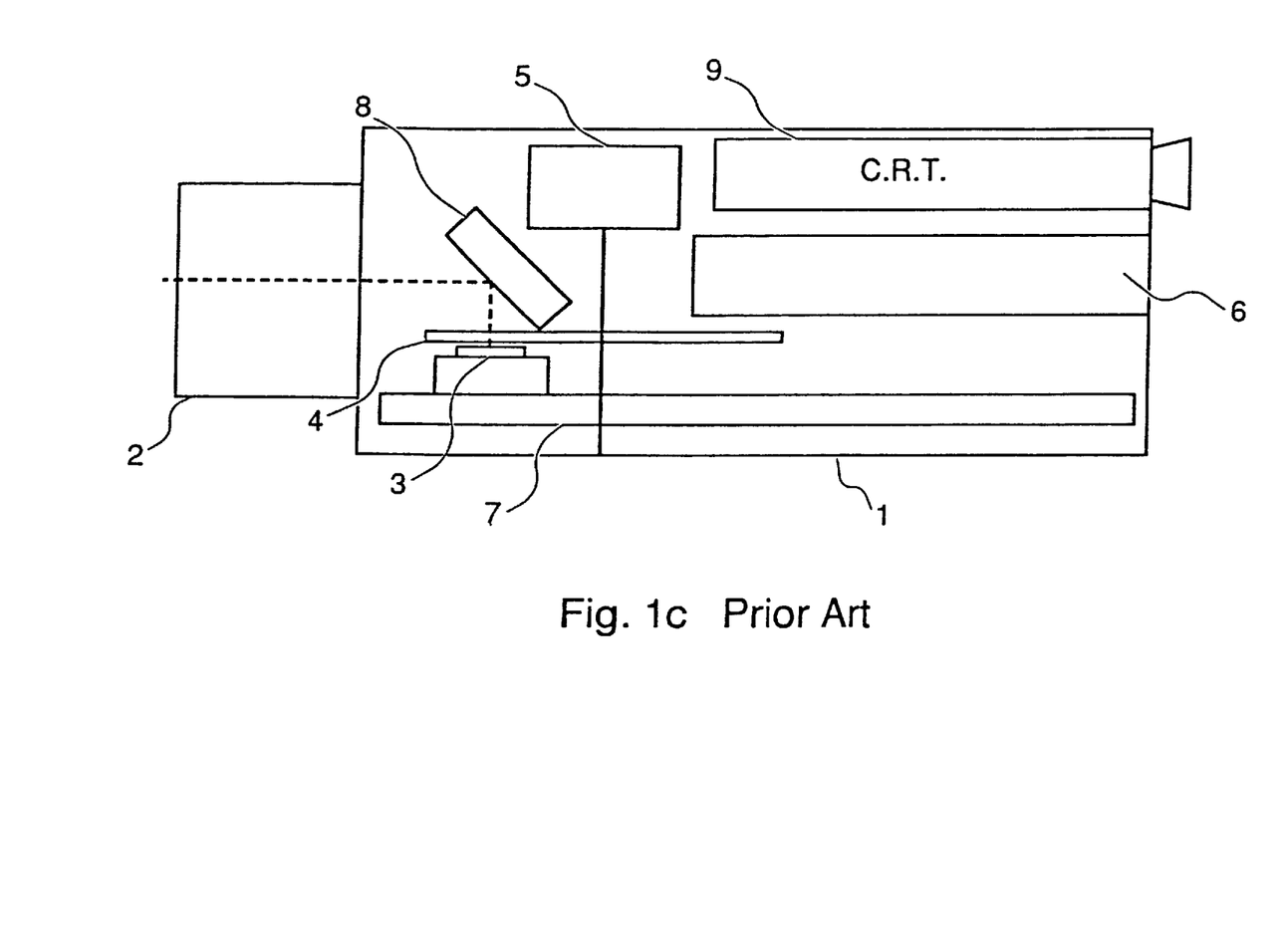
FIG. 1c is a schematic of a typical imager.

FIG. 1c shows a typical imager 1 for implementation of microscan. The imager 1 comprises a lens 2 focusing radiation on to an imaging array of thermal detectors 3. Such detectors require the radiation incident on them to be modulated by a chopper 4, driven by motor 5 energized by battery 6, in order for the detection process to work. A leading edge of the chopper 4 scans across the array 3 synchronously with readout from the array by the electronic circuit 7. Radiation from the scene is incident on the detector via a mirror 8. Microscan is achieved by tilting the mirror 8 while the entire detector is covered by the chopper 4. The processed image is viewed on a CRT 9. This implementation has the following disadvantages:

1. The microscan mechanism can be quite complex, since the mirror is ideally required to tilt in two orthogonal axes at a relatively high speed;

2. For maximum efficiency, the detector would be operated in consecutive fields, with the gaps between the chopper blades being exactly the same size as the detector itself. This would result in the entire detector being closed to radiation only for an instant. For the microscan mirror to move without degrading the image quality, this must be extended to a finite period—a blanking period—which can be a significant portion of the active field period. As a result the efficiency of the system is reduced;

3. The requirement of a fold in the optical path, for the reflective microscan to operate, limits the lowest f-number which the lens can achieve without vignetting, typically to greater than f/2.8;

4. The backworking distance of the lens must be maximized to fit the optical fold in; and 5. The entire assembly is difficult and costly to manufacture, requiring precision design and fabrication due to the large number of components competing for space close to the focal plane.

As an alternative to the prior art devices briefly described heretofore, U.S. Pat. No. 5,291,327 (McEwen) discloses a microscanning imager that includes a member in the form of a wheel for interrupting radiation between a lens and an array of imaging element. The member has alternate refractive transmissive regions and non-transmissive regions. The transmissive regions refracting radiation transmitted through them. As the disc rotates across the array the image focused on it moves giving successive frames which are shifted relative to one another. The displacement of an image across the array of sensing elements is achieved by refracting the radiation prior to incidence upon the array. This eliminates the need for an optical fold required with previous mirror arrangements, thereby relaxing the backworking distance requirement of the primary optical component. Although this invention appears to perform its intended function, it is known to have serious limitations. For instance, the alternate refractive transmissive regions and non-transmissive regions within the wheel define a microscanning pattern that cannot be varied without replacing the wheel with a different one having refractive elements in another configuration, or by using a plurality of wheels. The microscanning pattern is dependent upon the configuration of the refractive elements within the wheel. Moreover, the size of the transmissive region and the speed of rotation limit the radiation integration time and the frame rate of the array. There is thus a need for a robust mechanical system that is both precise and inexpensive.

It is an object of the present invention to provide an imager that overcomes at least some of the above problems.

It is a further object of the present invention to provide an inexpensive robust system for microscanning.

SUMMARY OF THE INVENTION

In accordance with an aspect of the invention, an imaging system is provided comprising an array of sensing elements defining an image plane; a lensing system adapted to focus an image on the image plane; and, means coupled to the lensing system for moving the lensing system a predetermined amount and on a predetermined plane parallel to the image plane so that the image focused by the lensing system on the array of sensing elements is displaced on the image plane by the movement of the lensing system.

In accordance with the invention there is further provided, an imaging system comprising: an array of sensing elements defining an image plane; a lensing system including at least one lens adapted to focus an image on the image plane; and, means coupled to at least a movable lens of the lensing system for moving at least the movable lens a predetermined amount and on a predetermined plane parallel to the image plane so that the image focused by the lensing system on the array of sensing elements is displaced on the image plane by the movement of the at least movable lens.

In accordance with another aspect of the invention, a method is provided of displacing an image on an image plane having a plurality of sensing elements, the method comprising the steps of:
 a) focusing the image on the plurality of the sensing elements on the image plane through at least a focusing lens of a lensing system; and
 b) displacing at least a lens of the lensing system parallel to the image plane and orthogonal to the optical axis of said lens to displace the image on the plurality of sensing elements on image plane.

In accordance with yet another aspect of the invention, an imaging system is provided that comprises: a stationary frame; a movable lens mounted to the stationary frame; flexure means for normally securing and holding the lens within the stationary frame in a fixed position, said flexure means, for allowing the lens to move along each of two orthogonal axes in the presence of force applied to the flexure means along each axis; and, means for applying the force to the flexure means.

BRIEF DESCRIPTION OF THE DRAWINGS

Exemplary embodiments of the invention will now be described in conjunction with the accompanying FIGS. 2 to 5 in which:

FIG. 4b is a side view of the system of FIG. 4a shown in a different position; and, FIG. 5 is an oblique view of a two-axis microscanning configuration wherein the microscanning operation is achieved by using two separate movable lenses that may be individually controlled.

DETAILED DESCRIPTION

Figure 2:
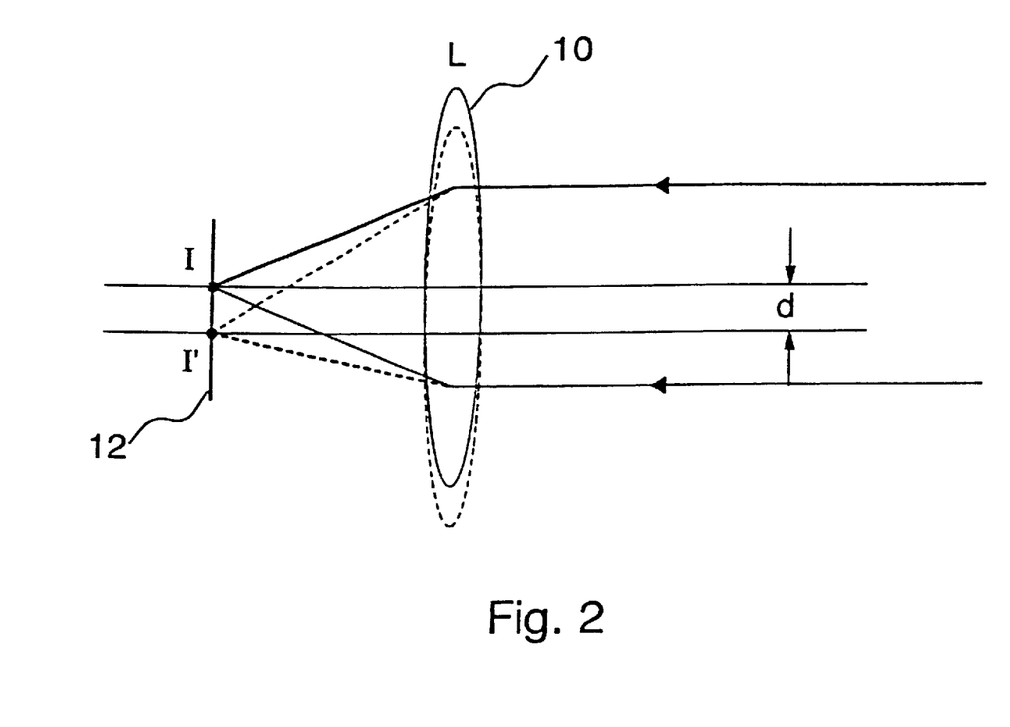
FIG. 2 is a side view of a lens adjacent an image plane illustrating the principles of the invention.

Referring now, to FIG. 2, a movable focusing lens 10 is shown spaced a predetermined distance from an image plane 12 of a detector array so that parallel light rays arriving at the lens 10 will be focused onto image plane 12 at a point I. This arrangement is illustrative of the principles of the invention; in a preferred embodiment, the lens 10 is replaced by a lens block comprising several lens elements coupled together to provide correction for optical aberration that is typically associated with a single lens system. In FIG. 2, a solid black line shows the lens 10 in a first position having a focal point I on the image plane; therefore an object at infinity is focused by the lens 10 onto the point I on the image plane. A dotted line shows the lens 10 in a second position having a focal point I'. Since the incoming light rays are parallel to the optical axis of the lens, the corresponding focal point also lies on the optical axis of the lens. As the lens 10 is displaced as by a distance d as shown by the dotted lines, the optical axis of the lens is also displaced by the distance d. Furthermore, the focal point and the image on image plane are both displaced by the distance d. Thus, displacing or offsetting the lens parallel to the image plane while maintaining its longitudinal distance from the image plane displaces the focal point on the image plane. Of course, the image can be displaced in any direction on the focal plane corresponding to the direction in which the lens is displaced.

Figure 1D:
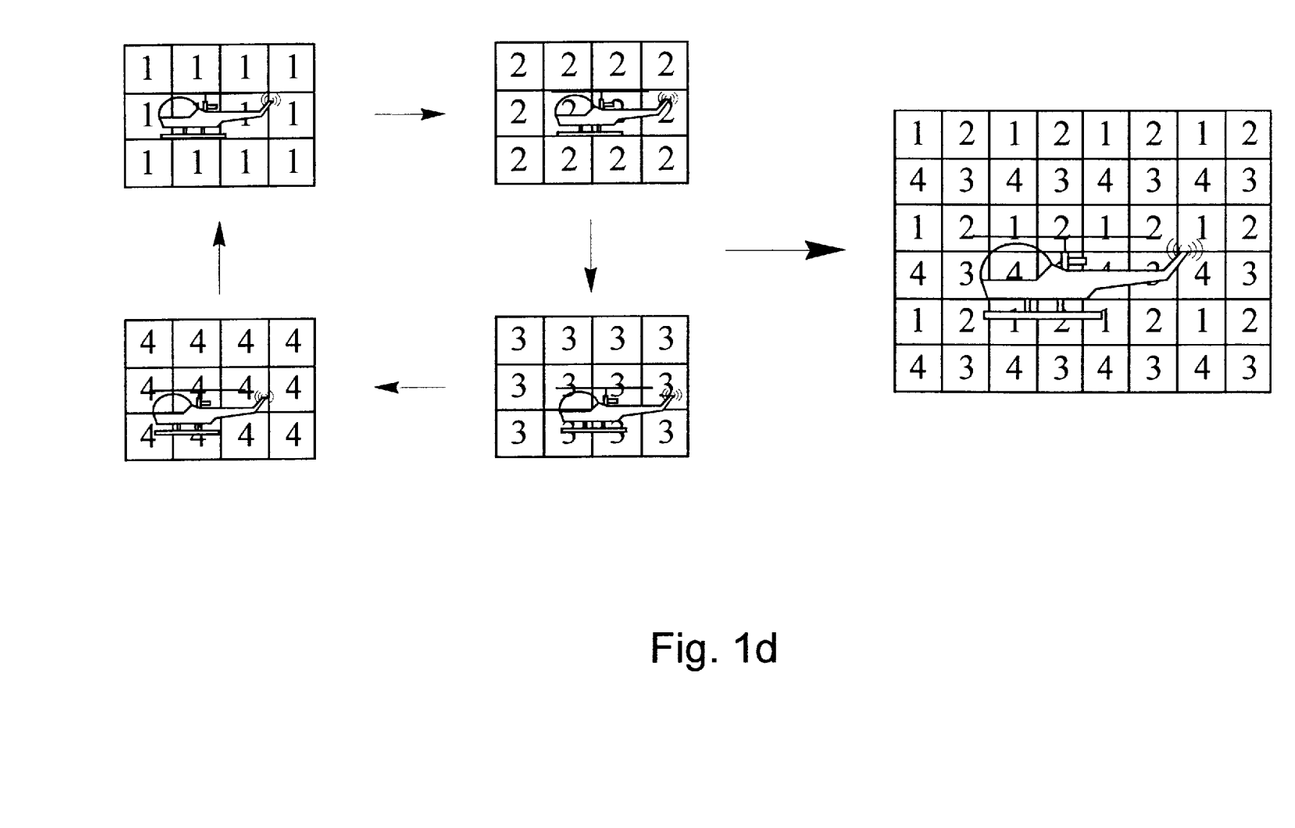
FIG. 1d is a pictorial diagram showing the steps required for a 2×2 microscanning operation.

Since microscanning is typically performed by moving an image on a detector mosaic or array, the image offset means in the form of the lens 10 described above, is arranged to produce a stepwise movement of the image along a closed trajectory as is shown in FIG. 1d. Referring now to FIG. 1d, a representation of the steps required for a 2×2 microscanning operation are shown. In the left part of the figure a first image is taken while keeping the image stable over the detector array for a duration suitable for integration. By moving the lens, the image is then moved to the right, as shown, by a half a pixel pitch distance and a second image is acquired. The image is then moved down for the third sample, and left to complete the cycle. The final microscanned image is then obtained from the four images previously acquired by interlacing all the pixels from all the images in both directions. This operation is shown in the right hand part of FIG. 1d.

Figure 3A:
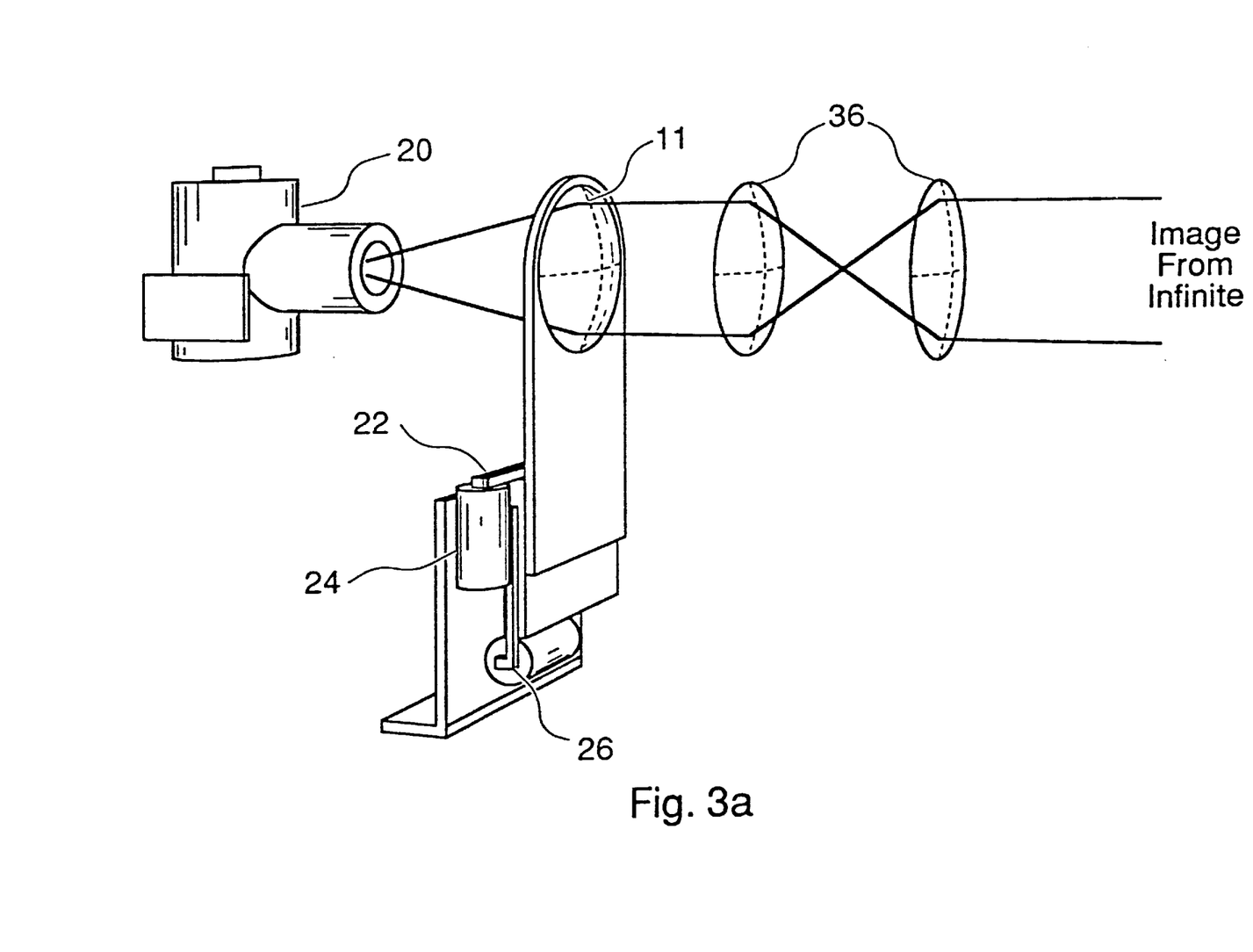
FIG. 3a is an oblique view of a microscanning system in accordance with an embodiment of the invention.

Referring now to FIG. 3a, a system is shown that includes an infrared detector array 20 positioned to receive an image from a microscanning lens 11 that focuses the image on the focal plane of the detector array 20. The system further includes a telescope 36 positioned to bring a distant image to the microscanning lens 11. The microscanning lens 11 is mounted on a two-axis translation table 22 and two piezoelectric positioners 24 and 26 control the position of the image on the detector array 20 by controlling the position of the lens 11. The telescope 36 placed in front of the microscanning lens is used to adjust the field of view. As was described above, a microscanning lens can comprise several lenses coupled together, however, in order to reduce the mass of the microscanning lens, it may be preferable to design the telescope to correct for and reduce optical aberrations within the system. In this manner, the system would allow faster image displacements and thus a higher image frame rate due to a microscanning lens 11 with less mass.

Figure 3B:
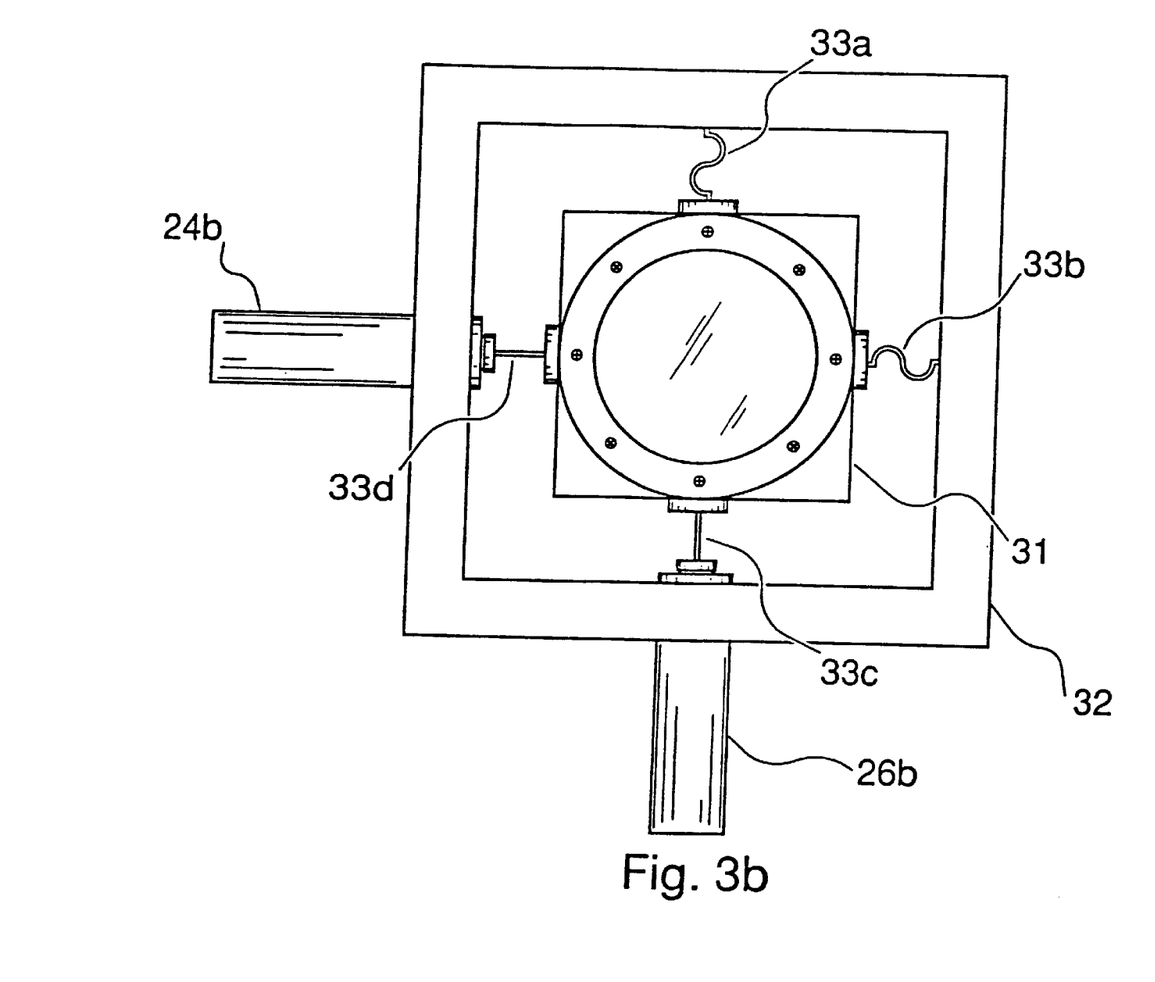
FIG. 3b is a plan view of a two-axis microscanning lens having a flexible joint coupling the lens to a lens holder.

Turning now to FIG. 3b, an alternative and preferred embodiment of a microscanning lens holder is shown having a lensing block held securely by a lens holder 31. The lens holder 31 is shown suspended within an outer frame 32. Two optional, spring joints 33a and 33b in the form of S-shaped metal bands couple adjacent sides of the lens holder 31 to insides of outer frame 32. Two laterally flexible joints 33c and 33d in the form of longitudinal metal bands couple two other adjacent sides of the lens holder 31 to piezoelectric positioners 24b and 26b rigidly fastened to the outer frame 32. This configuration allows the lens to be rigidly held within the outer frame 32, yet allows the lens to move in two directions toward and away the spring joints 33a and 33b when the piezoelectric positioners 24b and 26b move inward and outward. The lateral flexibility of joints 33c and 33d allow lateral movement when the other of the joints is being moved by its respective piezoelectric positioner.

Although the system shown in FIG. 3a in conjunction with the embodiment of FIG. 3b is preferable for microscanning, in certain circumstances, depending on the complexity and the mass of the detector lens 11 with its support, it may be advantageous to decompose the two-axis movement into two separate parts in order to reduce the mass of the movable components and improve performances; increasing the mass of the movable part of the system adversely affects the natural frequency of the system and consequently affects the maximum image frame rate attainable.

Figure 4A:
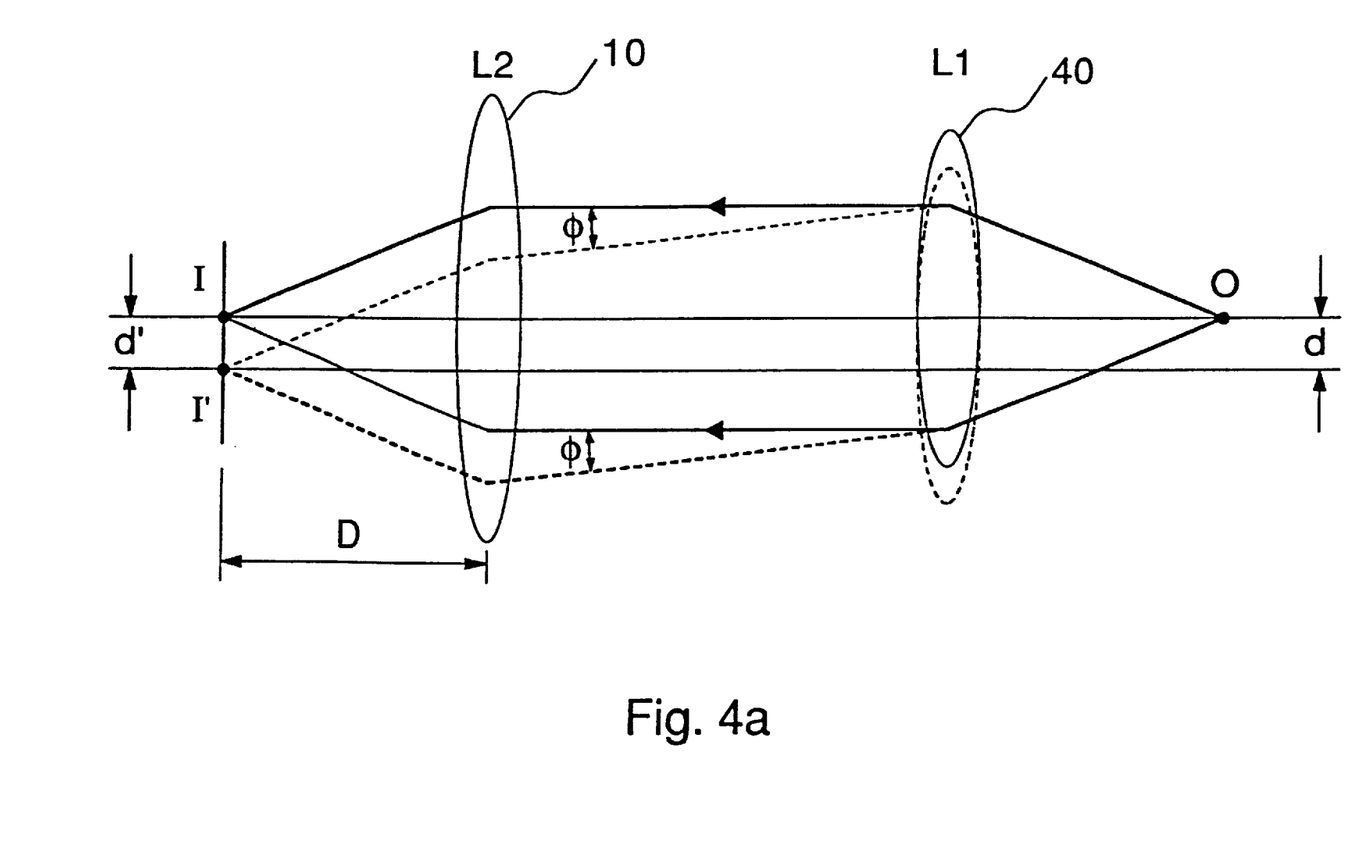
FIG. 4a is a side view of a system having two movable lenses illustrating the principles of the invention.
Figure 4B:
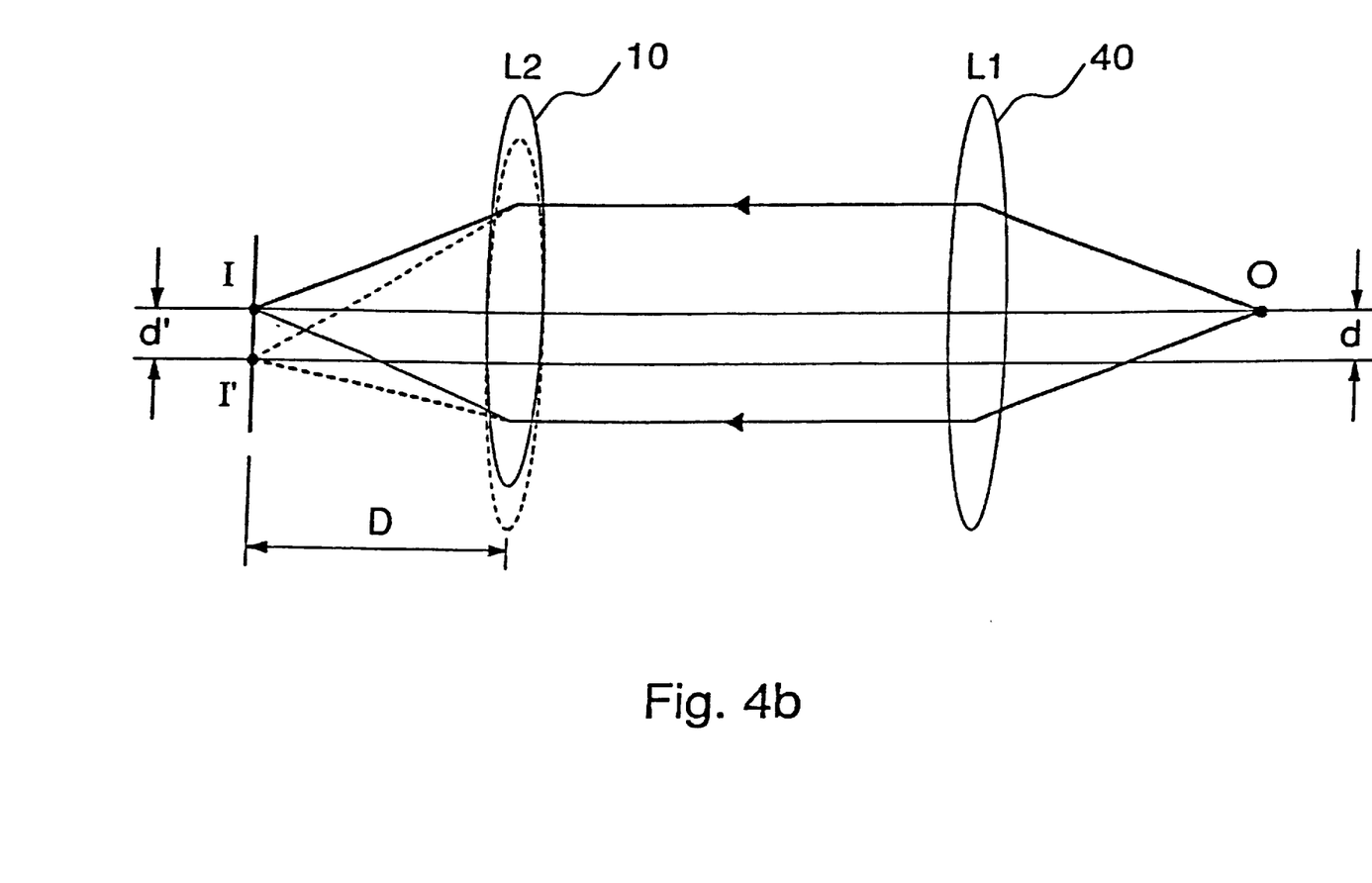

Referring now to FIGS. 4a and 4b, a two-movable-lens system is shown, wherein a lens 40 is placed in front of a focusing lens 10. FIGS. 4a and 4b illustrate that movement of lenses 10 and 40 along two axes can be separately controlled.

In FIG. 4a, light rays originating from the point O pass through the lens 40 and are sent as a parallel beam toward the lens 10 which focuses the beam onto the point I on the image plane. When the lens 40 is moved down by a distance d, the rays propagating from the point O exit from the lens 40 at an angle $\phi$ which is dependent upon the focal length of the lens 40. Subsequently, the lens 10 focuses the beam at a point I'. The distance D between the lens 10 and the image plane is dependent upon the focal length of the lens 10. Thus, the distance d' between I and I' on the image plane is related to the ratio of the focal length of the two lenses 10 and 40. FIG. 4b is essentially the same as that of FIG. 4a, however, the lens 40 in FIG. 4b converts the rays propagating from the point O into a parallel beam, while lens 10 is moved down by a distance d to displace the image at the focal plane by an amount d', as in FIG. 2.

Figure 5:
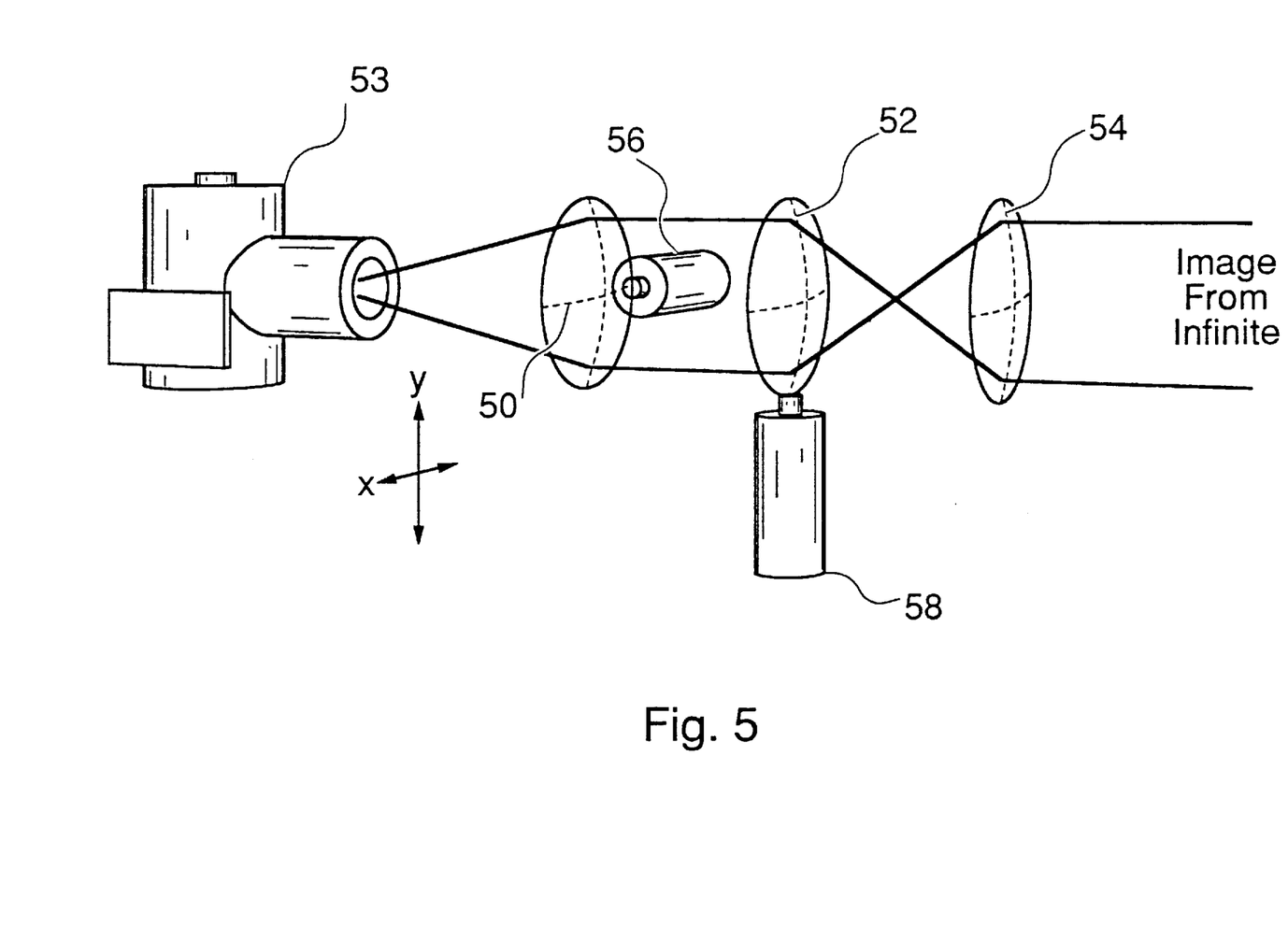

Turning now to FIG. 5, a modified two-axis microscanning configuration is shown wherein the microscanning operation is achieved by using two separate lenses. Preferably, the microscanning lenses 50 and 52 are kept as light as possible and a fixed non-movable lens may be provided as a means to correct for optical aberrations. The image arriving from the infinite in the form of a plurality of parallel light rays, is provided to lens 50 via a telescope formed of lenses 52 and 54.

In operation, the independent movement of the lenses 50 and 52 along two orthogonal axes is controlled by two piezoelectric transducers 56 and 58 respectively. Lens 50 provides movement along the x-axis while lens 52 provides movement along the y-axis. As the lens 50 is moved a distance d in the x-direction, the image on the image plane of the detector matrix 53 is moved accordingly, the same distance d in the x direction. As lens 52 is moved a distance d, the image on the image plane is displaced a distance d'. As was described in FIGS. 4a and 4b, d' is related to the focal length of the two movable lenses.

In summary, the invention described heretofore, provides a method and system for microscanning that obviates the requirement set out in many prior art systems of moving the microscanning image sensor. As well, the method and device is well suited to being used in a microprocessor driven system wherein the number of steps in each axis per pixel pitch as well as the image frame rate can be dynamically changed using the same physical configuration.

Of course, numerous other embodiments may be envisaged, without departing from the spirit and scope of the present invention.

What we claim is:

1. A microscanning imaging system for inducing a predetermined amount of dither so as to capture image data at sensing elements when a lensing system is moved by a predetermined distance, comprising:

an array of sensing elements defining an image plane;

a lensing system adapted to focus an image on the image plane; and, means coupled to the lensing system for moving the lensing system a same predetermined amount, a plurality of times, and on a predetermined plane parallel to the image plane so that the image focused by the lensing system on the array of sensing elements is displaced on the image plane by a same predetermined distance by the movement of the lensing system to predetermined locations for scanning an image and for providing an image at a plurality of different detector locations; and, means adapted to capture an image at each said location.

2. A microscanning imaging system as defined in claim 1, wherein the image focused by the lensing system on the array of sensing elements is displaced the predetermined amount on the image plane by movement of the lensing system on the predetermined plane, parallel to the image plane.

3. A microscanning imaging system as defined in claim 2, wherein the predetermined plane is orthogonal to an optical axis of the lensing system.

4. A microscanning imaging system as defined in claim 3, wherein the means coupled to the lensing system for moving the lensing system comprises a piezoelectric device.

5. A microscanning imaging system as defined in claim 3 wherein the lensing system includes:

a lens;

a lens holder for securely holding the lens; and wherein the imaging system includes a frame for mounting the lens and lens holder within; and, flexible mounting means for coupling the lens holder to the frame to allow the lens and lens holder to be movably held within the frame.

6. A microscanning imaging system as defined in claim 5, wherein the means for moving the lens and the lens holder within the frame, includes a piezoelectric device.

7. A microscanning imaging system as defined in claim 6, wherein the flexible mounting means includes a spring.

8. A method of microscanning an image on an image plane having a plurality of sensing elements, the method comprising the steps of:

a) focusing the image on the plurality of the sensing elements on the image plane through at least a focusing lens of a lensing system;

b) detecting the image focused on the image plane; and c) after said detecting step is completed, displacing at least a lens of the lensing system parallel to the image plane and orthogonal to the optical axis of said lens to displace the image on the plurality of sensing elements on the image plane in the absence of detecting the image focused on the image plane defined in step (b).

9. A method as defined in claim 8, wherein steps (a) to (c) are repeated sequentially a plurality of times, and wherein the lens is displaced along the same predetermined path after steps (a) to (c) are performed a plurality of times, each displacement performed in step (c) being a distance less than a sensing element's pitch.

10. A method as defined in claim 9, comprising the step of obtaining a single microscanned image from a first plurality of images detected after sequentially performing steps (a) to (c) said first plurality of times, comprising the step of interlacing said first plurality of images.

11. A microscanning imaging system comprising:

an array of sensing elements defining an image plane each of the sensing elements having a pitch p;

a lensing system including at least one lens adapted to focus an image on the image plane; and, means coupled to at least a movable lens of the lensing system for moving at least the movable lens a predetermined amount and on a predetermined plane parallel to the image plane so that the image focused by the lensing system on the array of sensing elements is displaced on the image plane less than the pitch p by the movement of the at least movable lens, and means for interlacing a plurality of sequential images captured by the sensing elements to form a single image of improved resolution.

12. An imaging system as defined in claim 11 wherein the lensing system includes a plurality of lenses coupled together for focusing the image on the image plane, and wherein the plurality of focusing lenses includes the at least movable lens.

13. An imaging system as defined in claim 12 wherein the lensing system includes at least two movable lenses, each of the at least two moveable lenses being movable in different directions along a plane orthogonal to the optical axis of that lens and parallel to the image plane.

14. An imaging system as defined in claim 11, wherein the means coupled to at least a movable lens of the lensing system for moving at least the movable lens includes a piezoelectric transducer.

15. An imaging system as defined in claim 12, wherein the means coupled to at least a movable lens of the lensing system for moving at least the movable lens includes a plurality of piezoelectric transducers.

16. An imaging system as defined in claim 11 having means for flexibly mounting the at least movable lens to a stationary frame.

17. An imaging system as defined in claim 16, wherein the means for moving the at least movable lens includes means for controllably moving the at least movable lens relative to the stationary frame.

18. An imaging system as defined in claim 17, wherein the lensing system includes a telescope having a plurality of lenses.

19. An imaging system as defined in claim 18 wherein at least two lenses of the lensing system are movable, and wherein one of said movable lenses includes the at least one lens adapted to focus the image on the image plane and wherein the other of the two movable lenses includes a lens of the telescope.

20. An imaging system as defined in claim 19, wherein the at least two movable lenses are movable along different orthogonal axes.

21. An imaging system as defined in claim 16, wherein the means for flexibly mounting the at least movable lens to the stationary frame includes at least two springs for normally maintaining the lens in a predetermined position and location in the absence of applied force, each of the springs for allowing movement of the at least moveable lens along two orthogonal axis in the presence of an applied force; and, at least two elongate laterally flexible joints, each elongate laterally flexible joint for forcing the at least moveable lens to move along an axis corresponding to the longitudinal axis of the respective elongate joint, one joint being laterally flexed when a force is applied to the other joint along its longitudinal axis.

* * * * *